United States Patent [19]
Lundquist

[11] Patent Number: 5,227,057
[45] Date of Patent: Jul. 13, 1993

[54] RING CENTRIFUGE APPARATUS FOR RESIDUAL LIQUID WASTE REMOVAL FROM RECYCLABLE CONTAINER MATERIAL

[76] Inventor: Lynn C. Lundquist, 10833 NE. Russell, Portland, Oreg. 97220

[21] Appl. No.: 896,626

[22] Filed: Jun. 10, 1992

Related U.S. Application Data

[63] Continuation-in-part of Ser. No. 677,307, Mar. 29, 1991, Pat. No. 5,149,424.

[51] Int. Cl.$^5$ .............................................. B01D 33/06
[52] U.S. Cl. .................................... 210/174; 210/374; 210/377; 210/394
[58] Field of Search ................. 210/374, 377, 394, 174

[56] References Cited

U.S. PATENT DOCUMENTS

| | | | |
|---|---|---|---|
| 1,749,368 | 3/1930 | Behr | 210/377 |
| 2,878,943 | 3/1959 | Ziherl | 210/374 |
| 3,256,994 | 6/1966 | Koelsch | 210/374 |
| 3,311,240 | 3/1967 | Hirsch | 210/212 |
| 3,366,318 | 1/1968 | Steimel | 233/5 |
| 3,882,025 | 5/1975 | Talley, Jr. | 210/354 |
| 4,122,014 | 10/1978 | Weininger et al. | 210/377 |
| 4,137,176 | 1/1979 | Dudley et al. | 210/375 |
| 4,186,096 | 1/1980 | Areaux et al. | 210/377 |
| 4,253,960 | 3/1981 | Dudley et al. | 210/373 |

Primary Examiner—Robert A. Dawson
Assistant Examiner—David Reifsnyder

[57] ABSTRACT

The present invention is a centrifuge device which separates chips or shreds of containers from whatever liquid residue remains within these containers. Though this technology is suitable for a number of applications, a primary objective is the separation of the recyclable plastic of a motor oil container from the remaining re-usable motor oil within the container after the container has ostensibly been emptied. It is an objective to accomplish this in an economically advantageous manner which uses neither a solvent nor a wash process, and which reclaims the oil in a suitable form for reprocessing. In its preferred embodiment, the present invention may be utilized as a compact, free-standing size reduction and reclaiming device at the location where the container is used, such as in automotive service stations, and the like. In a second embodiment, production units may be used in plastic reclaiming plants where large quantities of a given plastic container are being centrally processed.

2 Claims, 4 Drawing Sheets

RING CENTRIFUGE APPARATUS FOR RESIDUAL LIQUID WASTE REMOVAL FROM RECYCLABLE CONTAINER MATERIAL

DIVISION OF APPLICATION

This is a continuation-in-part of application Ser. No. 07/677,307 filed Mar. 29, 1991, entitled CENTRIFUGE APPARATUS FOR RESIDUAL LIQUID WASTE REMOVAL FROM RECYCLABLE CONTAINER MATERIAL (Now U.S. Pat. No. 5,149,424).

BACKGROUND

1. Field of the Invention

This invention provides a means for centrifugally separating residual oil or other liquid contamination from shredded or granulated containers used to package the oil or other liquid. In principle, chips or shreds from a granulator or shredder are fed into the receiving hopper of a centrifugal device which separates the oil (or other liquid) from the container material. The separated liquid is subsequently reclaimed, while the chipped or shredded container material is further processed toward a finished plastic substance.

With an understanding of the present need to protect both our natural environment and to optimize the use of natural resources, the importance of this apparatus should be readily apparent. In a first case, a mechanical separation of the residual liquid (most notably, motor oil) from its chipped or shredded container assures less pollutants introduced into the waste stream from cleaning operations in the form of an emulsion of water, detergents, and the specific material in the container. In a second case, a mechanical separation assures a greater return of product into its highest value usage with the least energy expended; that is, motor oil may be recovered in the form of pure motor oil rather than as an emulsion which requires expensive reprocessing for commercial reuse.

2. Description of the Prior Art

The technology of centrifugally separating residual liquid which was packaged within a container from the material proper of said container subsequent to shredding or comminution of the container has not heretofore been addressed in any patent other than those developed by this inventor. (That is to say, CENTRIFUGE APPARATUS FOR RESIDUAL LIQUID WASTE REMOVAL FROM RECYCLABLE CONTAINER MATERIAL (Ser. No. 07/677,307), now U.S. Pat. No. 5,149,424 CONTINUOUS CENTRIFUGE APPARATUS FOR RESIDUAL LIQUID WASTE REMOVAL FROM RECYCLABLE CONTAINER MATERIAL (Ser. No. 07/696,765), METHOD OF CONTINUOUS CENTRIFUGAL REMOVAL OF RESIDUAL LIQUID WASTE FROM RECYCLABLE CONTAINER MATERIAL (Ser. No. 07/701,778), now U.S. Pat. No. 5,160,441 METHOD OF BATCH CENTRIFUGAL REMOVAL OF RESIDUAL LIQUID WASTE FROM RECYCLABLE CONTAINER MATERIAL (Ser. No. 07/703,007), and, CONTINUOUS PROCESS FOR RECLAIMING PLASTIC SCRAP (Ser. No. 07/781,085).) This is particularly true for plastic containers in the form of blow molded bottles which have contained motor oils or similar non-water soluble liquids.

A new body of technology is growing for the purpose of reclaiming such plastic and other container materials. In most cases, however, the technology has used mechanical agitation in conjunction with washing and soaking baths to remove the contaminant from the chipped or shredded container.

Centrifugal separation of a residual liquid contaminant of a container, and the shredded material proper from the container, is a novel innovation as suggested in this series of inventions.

Numerous mechanical separation devices have been devised which use centrifugal action. Among them, are those which centrifugally separate cutting fluids and oils from metal chips, borings, and the like as encountered in machine shop operations. In this regard, the patents of Dudley et all (U.S. Pat. Nos. 4,137,176 and 4,253,960), Areaux et al. (U.S. Pat. No. 4,186,096), Weininger et al. (U.S. Pat. No. 4,122,014), Rousselet (U.S. Pat. No. 3,570,135), Steimel (U.S. Pat. No. 3,366,318), and Ziherl (U.S. Pat. No. 2,878,943) deserve attention. (Note that the two patents of Dudley and the patent of Areaux are refinements of the same practice.) Prior art by Welch (U.S. Pat. No. 636,016) for the removal of liquid from garbage also merits attention. It can be shown, however, that each of these representations of the prior art are substantially different from both the function and the intended use of the present invention.

OBJECTIVES OF THE INVENTION

This invention was developed with an understanding of the limitations of the present methodology used to dispose of, or reclaim, containers with residual liquid waste (most notably plastic oil filled containers). Furthermore, it was designed with a number of other objectives considering its potential application.

1. It is the general objective of this invention to provide a means of mechanically separating residual liquid waste (motor oil) contamination from a chipped or shredded, plastic container.

2. Another objective of this invention is to remove this residual liquid waste (motor oil) without creating an emulsion by the addition of water or other chemicals.

3. Another objective of this invention is to salvage this residual liquid water (motor oil) in a usable form for further use without significant product down-grading.

4. Another objective of this invention is to separate the residual liquid waste (motor oil) or other contaminant from the plastic product without introducing that contaminant into the waste water stream.

5. Another objective of this invention is to provide a centrifugal separation apparatus which uses no doors or other mechanical dumping apparatus.

6. Another objective of this invention is to provide a compact and efficient unit which could be used in an automotive service station or the like.

7. Another objective of this invention is to provide an embodiment of the invention which may be used on a larger scale in a plastic reprocessing plant to separate residual liquid waste (motor oil or other liquid contaminants) from the plastic to be reprocessed.

8. A final objective of this invention is to utilize the technology of three previous patent applications to this oil separation methodology. That is, the application entitled CUTTER ENHANCEMENT FOR PLASTIC SIZE REDUCTION EQUIPMENT, U.S. Pat. No. 5,110,060, the application entitled SECONDARY CUTTER APPARATUS FOR PLASTIC SIZE REDUCTION EQUIPMENT, Ser. No. 07/667,677, now U.S. Pat. No. 5,143,307 and the application entitled CENTRIFUGE APPARATUS FOR RESIDUAL LIQUID WASTE REMOVAL FROM RECYCLABLE CONTAINER MATERIAL, Ser. No. 07/677,307 no U.S. Pat. No. 5,149,424.

These and other objectives and advantages of the present invention, and the manner in which they are achieved, will become apparent in the following specifications and claims.

SUMMARY OF THE INVENTION

In its preferred embodiment, the present invention is a centrifuge device for the purpose of separating chips or shreds of containers from whatever liquid residue remains within these containers. Though this technology is suitable to many diverse applications, one of its primary functions is the separation of the recyclable plastic contained in a motor oil container from the remaining re-usable motor oil within the container after the container has ostensibly been emptied. It is an objective to accomplish this in an economically advantageous manner which uses neither a solvent nor a wash process, and which reclaims the oil in a suitable form for reprocessing.

In its preferred embodiment, the present invention may be utilized in at least two primary applications. As a compact, free-standing unit, the invention may be used as a size reduction and reclaiming device at the location where the container is used. Such would be the case in automotive service stations, retail outlets, and the like where the end-user of motor oil products is required to properly dispose of the empty containers in an environmentally prudent manner. In a second application, production units may be used in plastic reclaiming plants where large quantities of a given plastic container are being centrally processed. (Chipping or shredding of the container may take place in a location distant from the centrifugal unit in this latter application.) In this case, not only does the device keep the separated liquid from the waste water treatment stream, it separates it while it is still in a salable form to oil recovery processing plants.

This invention operates as a batch process apparatus. In the preferred embodiment, a source of container chips or shreds from an appropriate cutter head is fed into the stationary or partially revolving rotating sieve. During the interval wherein the rotating sieve is being loaded, and subsequently during the duration of the centrifugal process, the rotating sieve is driven at sufficient angular rotation speed so that the residual liquid waste contaminant is thrown from the material and through the sieve screening.

By means of an appropriately designed slinger arrangement on the rotating sieve, the residual liquid waste material (notably motor oil) is slung against the inside wall of the containment housing and filtered and pumped into a collection vessel. A slowly rotating mechanical rake is provided for tumbling (re-orienting) the chips or shreds during the process which will expose all surfaces of these chips or shreds to the centrifugal action.

In yet another application, a solvent may be injected into the rotating sieve during high speed operation. In so doing, the contaminant is removed from the chip or shred material at a high concentration level. In this manner, the centrifugal process of this invention alleviates the need of reclaiming the soluble and solid materials from large volumes of waste water such as are encountered with a typical wash process. Plastic detergent bottles and the like are examples of plastic container materials which are encountered in this latter process. Initial removal of residual soap is done centrifugally to remove the soap in high concentration levels prior to subsequent washing processes which puts the remainder of the soap into the waste water stream at a low level of concentration.

At the termination point of the separation process, the rotating sieve is slowed or stopped which allows the liquid-free material (notably plastic container chips or shreds) to gravity feed to the outlet of the the apparatus for subsequent reclamation processing. In some cases, an air blast may be used to enhance the gravity fed discharge of the processed material.

DESCRIPTION OF THE PREFERRED EMBODIMENTS

To simplify the description, symmetrical parts, or portions of a single part where divided by a sectional view, will be designated with a prime ('). The description of the part(s) having primed reference characters will be limited to a minimum.

Figure 1:
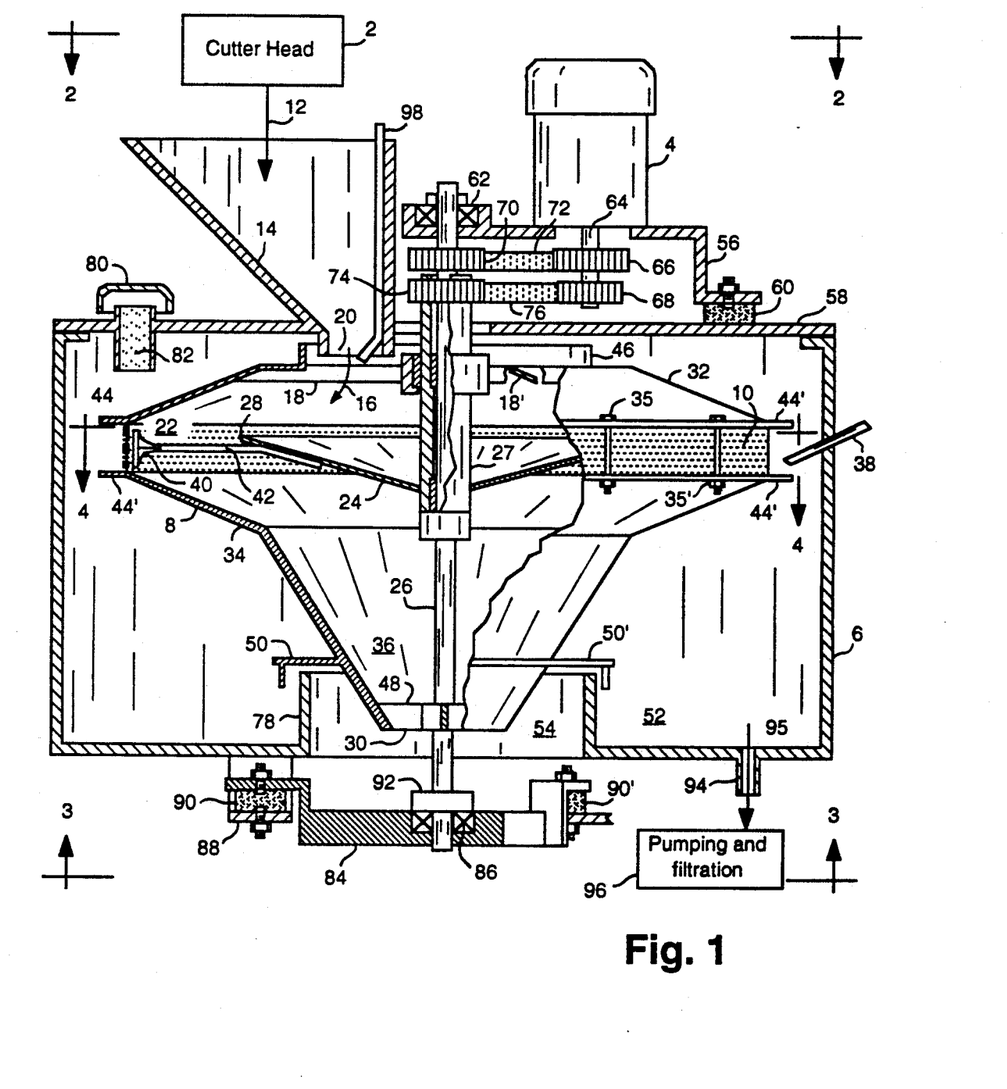
FIG. 1 is a sectional view of the centrifuge unit.

Referring now to FIG. 1, the concept of the preferred embodiment is shown in a sectional assembly view. The entire apparatus is comprised of three sub-assemblies. At the top of the unit a shredding or granulating sub-assembly is provided such as illustrated by the cutter head 2. (This may be the assembly described in U.S. Pat. No. 5,110,060 entitled CUTTER ENHANCEMENT FOR PLASTIC SIZE REDUCTION EQUIPMENT, and may further include the apparatus of the application entitled SECONDARY CUTTER APPARATUS FOR PLASTIC SIZE REDUCTION EQUIPMENT, Ser. No. 07/667677.) now U.S. Pat. No. 5,143,307.

As will be fully described later, the drive motor 4, the containment vessel 6, and their related assemblies, constitute the stationary sub-assembly.

The rotating centrifugal separation unit 8 is the third sub-assembly consisting of the ring sieve 10 and related components.

Oil, or other liquid contaminated containers are fed into the cutter head 2 for reduction into chips or shreds 12. The chips or shreds 12 are conveyed by means of a hopper 14 into the centrifugal separation unit 8.

The chips or shreds 12 flow from the hopper 14 into the centrifugal separtion unit 8 at 16. A top support 18 for the centrifugal separation unit 8 is formed with an airfoil as shown at 18'. This airfoil carries the material from the hopper discharge 20 into the rotating sieve screen processing area 22. The direction of rotation of the centrifugal separation unit 8 is established such that the airfoil 18' of the top sieve support 18 forces the material in a downward direction when the unit is in motion.

A catch pan 24 is annularly mounted to the central shaft 26 and its related assemblies. (The complete central shaft assembly will be further identified and described in FIG. 5. The actual shaft which is driving the catch pan 24 is the intermediate shaft 27.) If the centrifugal separation unit 8 is not in motion, or is turning at slow speed, the flow from the hopper 16 will fall unto the catch pan 24. As the centrifugal separation unit 8 increases in rotational velocity, all chips or shreads 12 and contaminate liquid is thrown to the rotating sieve screen processing area 22. The catch pan periphery 28 is sufficiently large in diameter so that chips or shreds 12 will not fall past the catch pan 24 to the bottom discharge opening 30 from the hopper discharge 20 area.

The rotating sieve screen processing area 22 of the centrifugal separation unit 8 is so constructed that the ring sieve 10 is on the outer periphery of an area narrowly confined by the centrifugal separation unit cover 32 and the centrifugal separation unit body 34. The centrifugal separation unit cover 32 is constructed so that it may be removed from the centrifugal separation unit body 34 and is fastened to the lower member with a series of circumferentially located tie bolts 35. It should be noted that the rotating sieve screen processing area 22 is defined by steeply angled walls (relative to the direction of fluid movement) of the centrifugal separation unit cover 32 and the centrifugal separation unit body 34 so that motor oil similar liquid contaminant is readily carried through the ring sieve 10 by centrifugal acceleration.

Upon completion of a cycle, the angular velocity of the rotating centrifugal separation unit 8 is reduced so that the chips or shreds 12 in the rotating sieve screen processing area 22 will fall into the bottom portion 36 of the separation unit 8 and exit through the discharge opening 30 during the dump cycle. An air blast 38 is provided which enhances the movement of the chips or shreds 12 during the dump cycle, forcing them into the bottom portion 36 of the unit.

A set of opposing rakes 40 are attached to the catch pan 24 by rake arms 42. The rakes 40 slowly rotate relative to the centrifugal separation unit 8 and tumble the chips or shreds 12 in the sieve screen processing area 22.

The ring sieve 10 is bordered by annular slinger rings 44 which sling the liquid contaminant into the containmant vessel 6. The centrifugal separation unit cover 32 has a vertical catch lip 46 to contain the process material when it leaves the hopper discharge 20. At the bottom portion of the rotating centrifugal separation unit 8, a spreader 48 is employed to rigidly affix the central shaft 26 to the separation unit body 34.

In the preferred embodiment, a separation unit slinger 50 is employed to separate the interior of the containment vessel 52 from the discharge portion 54 of the containment vessel.

The drive unit consists of the drive motor 4 mounted to a drive frame 56. The drive frame 56 is mounted to the containment vessel cover 58 by means of a multiplicity of resilient vibration isolation mounting supports 60. The drive frame 56 also embodies the upper shaft bearing 62 support.

Attached to the drive motor shaft 64 are a main shaft motor pulley 66 and an intermediate shaft motor pulley 68; all upper drive systems use cog belts and cog belt pulleys. The main shaft motor pulley 66 is connected to a main shaft pulley 70 of substantially the same diameter by means of a main shaft drive belt 72. Thus, the motor shaft 64 angular velocity and the main shaft 26 angular velocity are substantially the same. However, the intermediate shaft motor pulley 68 is connected to an intermediate shaft pulley 74 by means of an intermediate shaft belt 76 in such a way that the intermediate shaft turns at slightly lower angular velocity than the main shaft. That is, with an intermediate shaft motor pulley 68 slightly smaller in diameter than its corresponding intermediate shaft pulley 74, the speed ratio is reduced. (Further details of the intermediate shaft will be explained in conjunction with the description of FIG. 5.)

The containment vessel 6 has a central vertical baffle 78 which assures that liquid contained within the interior of the containment vessel 52 will be sufficiently isolated from the discharge opening 30 of the rotating centrifugal separation unit 8 so that cross contamination of either the processed chips or shreds 12 or the removed liquid contaminant does not ensue.

Because the centrifuge acts as an air pump, the interior of the containment vessel will have a higher pressure than atmosphere. Therefore, at least one containment vessel air vent 80 is provided to equalize the internal air pressure. To prevent liquid contaminant from blowing through the air vent 80, its interior is packed with a loosely woven batting 82 to separate the liquid contaminant from the air.

Figure 3:
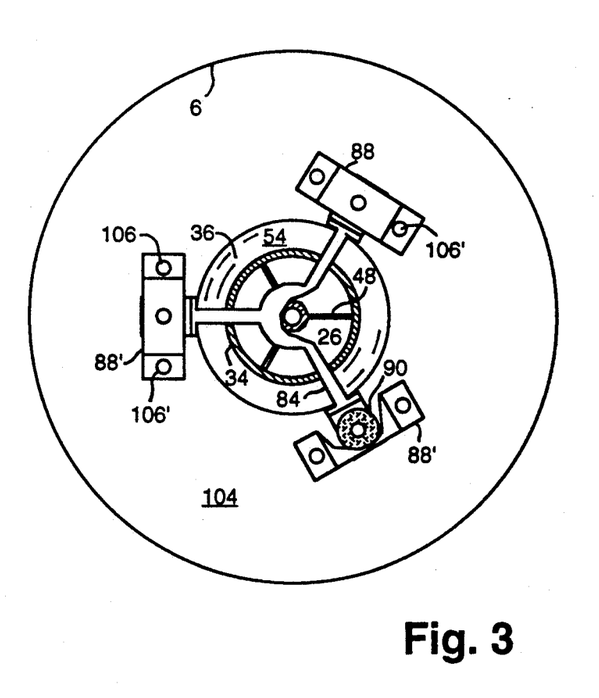
FIG. 3 is a bottom plan view of the centrifuge unit taken along line 3—3 of FIG. 1.

A lower mounting bracket 84 supports the lower portion of the central shaft 26 by means of a lower bearing assembly 86. The lower mounting bracket 84 is supported at three locations (as is shown in FIG. 3). Each support consists of a support stirrup 88 rigidly attached to the containment vessel 6, and a resilient lower vibration isolation mounting support 90 in compression between the lower mounting bracket 84 and the support stirrup 88. The central shaft 26 is secured to the bearing by means of a locking collar 92 located in such a way that the bearing is also protected from contamination by this same locking collar 92.

In the preferred embodiment, the liquid contaminant (namely, motor oil) which is collected in the interior of the containment vessel 52 is conveyed to a collection point through a drain pipe 94. The reclaimed oil 95 is generally evacuated by means of a pumping and filtration unit 96.

In some applications, a solvent is sprayed into the rotating centrifugal separation unit 8 for the purpose of diluting the liquid contaminant. This is accomplished by means of a solvent spray tube 98 located in the hopper 14.

Figure 2:
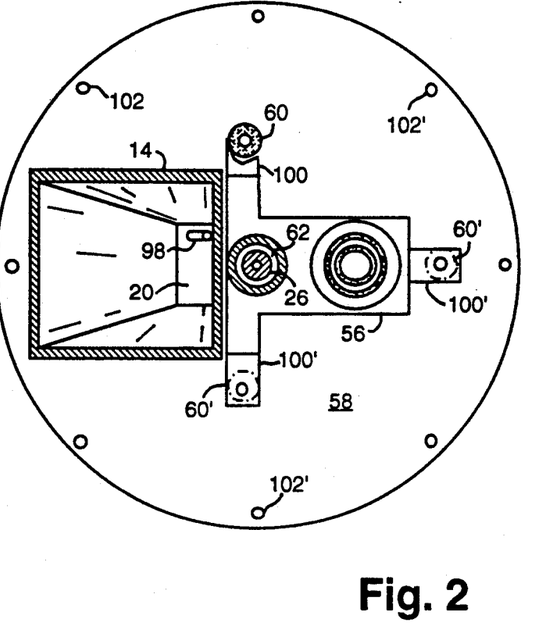
FIG. 2 is a top plan view of the centrifuge unit taken along line 2—2 of FIG. 1.

FIG. 2 shows the details of the unit from a top view along 2—2 of FIG. 1. In this view, the cutter head 2 has been removed. The hopper 14 is more completely shown from this view. Chips or shreds 12 will be carried to the hopper discharge 20 where they will flow from the hopper at 16. The solvent spray tube 98 may be located within the hopper 14 as shown in this view.

The drive frame 56 in the preferred embodiment is constructed with three support feet 100, each of which is resting on a resilient vibration isolation mounting support 60. The resilient vibration isolation mounting supports 60 are directly attached to the containment vessel cover 58. The drive motor 4 is directly secured to the drive frame 56 which has provision for the upper shaft bearing 62 support.

The containment vessel cover 58 is secured to the containment vessel 6 (not shown in this view) by a series of circumferentially located mounting bolts 102.

FIG. 3 is a bottom view of the containment vessel 6 taken along 3—3 of FIG. 1. More complete detail of the lower mounting bracket 84 is shown in this figure. In the preferred embodiment, this bracket consists of three points of attachment to the containment vessel 6. Each of these three mounting points consists of a support stirrup 88 attached to the containment vessel bottom 104 with appropriate fasteners 106. Between each mounting portion of the lower mounting bracket 84 and the supporting stirrup 88 is a resilient lower vibration isolation mounting support 90.

This figure also shows a more complete view of the centrifugal separation unit body 34 in cooperation with the spreader 48 which locates the bottom portion 36 of the rotating centrifugal separation unit 8 in relation to the central shaft 26. The discharge portion 54 of the unit is also shown.

Figure 4:
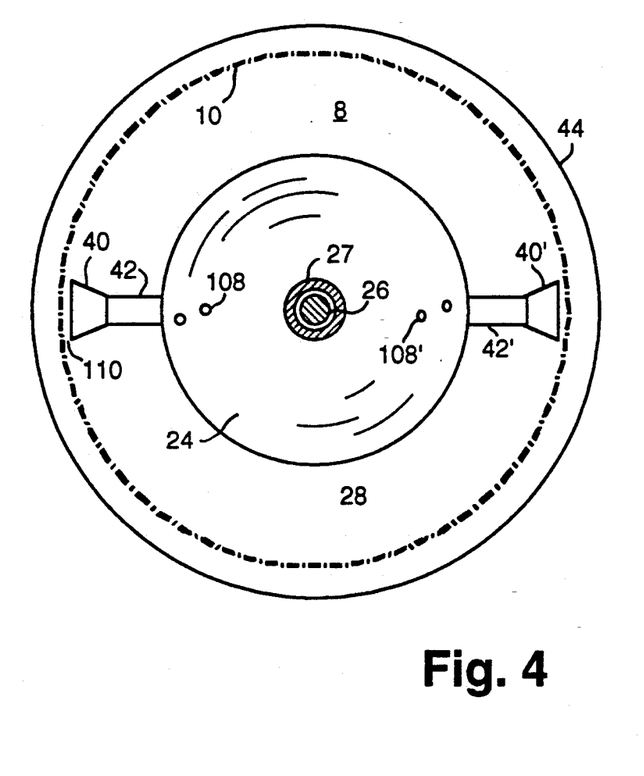
FIG. 4 is a top plan view of the catch pan and rake taken along line 4—4 of FIG. 1.

FIG. 4 is a view of the catch pan 24 along 4—4 of FIG. 1. In the preferred embodiment, two opposingly located rakes 40 and rake arm 42 assemblies are mounted to the catch pan 24 with appropriate fasteners 108 as shown. The rakes 40 are so located that they clear the ring sieve 10 with a minimum operational clearance at 110. (In practice, this minimum operational clearance would be approximately one-eighth to one-quarter of an inch between the further extremity of the rake 40 and the ring sieve 10.)

This view further shows the relative locations of the central shaft 26 and the intermediate shaft 27.

Figure 5:
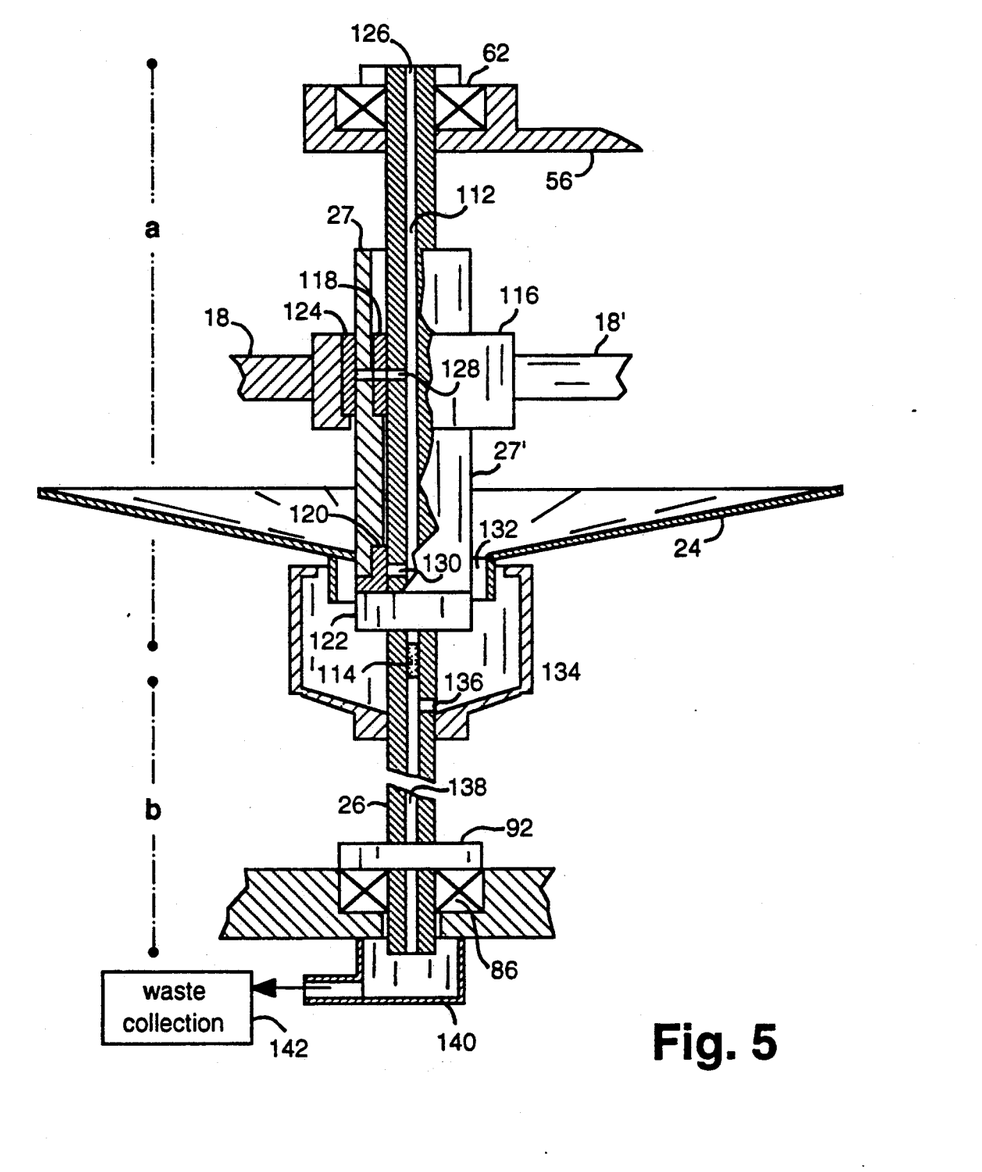
FIG. 5 is a sectional view of the shaft and drip pan.

FIG. 5 is a view of the assembly of the catch pan 24, the central shaft 26, and the intermediate shaft 27. In this embodiment, the central shaft 26 is hollow as indicated at 112. A shaft plug 114 separates the the upper a and lower b sections of the central shaft 26. In the upper section a, this hollow passage constitutes the lubrication conduit of the intermediate shaft 27; in the lower section b, the hollow passage allows for oil drainage.

A multiplicity of bushing bearings are used which allow free rotation of the intermediate shaft 27 on the central shaft 26, and the top support hub 116 on the intermediate shaft 27. An upper intermediate shaft bushing 118, and a lower intermediate shaft bushing 120, provide the bearing surfaces between the intermediate shaft 27 and the central shaft 26. The lower intermediate shaft bushing 120 is additionally the thrust bearing which supports the upper weight of the rotating mechanism against the central shaft thrust collar 122. A support hub bushing 124 provides the bearing surface between the intermediate shaft 27 and the support hub 116.

The upper section a of the central shaft 26 can be filled with a lubricating oil from the opening at 126 to lubricate the three bushings. When the shaft hollow 112 is filled with a lubricating oil, the oil can pass through an upper lubrication passage 128 which conveys oil to both the intermediate shaft bushing 118, and the support hub bushing 124. (The individual drilled passages for the upper lubrication passage 128 are shown in alignment in the figure. In practice, an annular grove is machined in the bushing which connects with the lubrication passage 128.) In a similar manner, a lower lubrication passage 130 allows the oil to flow from the shaft hollow 112 to the lower intermediate shaft bushing 120.

Some oil will be collected in the catch pan 24 which must be drained without contaminating the processed material. A catch pan drain 132 allows the liquid contaminant (most notably engine oil) to flow into a shaft drain cup 134. The liquid contaminant drains from the shaft drain cup 134, through the shaft drain passage 136, flowing down the hollow shaft at 138 and into the waste collection basin 140. From the waste collection basin 140 the liquid contaminant is conveyed to the waste collection 142 area.

The waste collection system also prevents the lubricating oil from contaminating the processed material. Any oil dripping from the support hub bushing 124 will fall into the catch pan 24. Lubricating oil escaping from the thrust collar 122 will be caught in the shaft drain cup 134.

OPERATION

In all embodiments, some means of delivering chips or shreds 12 to the hopper 14 is achieved. In an embodiment for use in such locations as an automotive service station and the like, the chips or shreds 12 would be generated within the same assembly from a cutter head 2. (In an industrial setting, the chips or shreds may be generated remotely from the centrifuge unit and conveyed to it for processing.) For ease of description in the following embodiments, unless specifically required to identify otherwise, the source of chips or shreds 12 will be described as through coming from a cutter head 2 which is integral to the assembly.

Chips or shreds 12 contaminated with a residual liquid waste material (notably motor oil) are delivered into the hopper 14, and are thereafter discharged into the rotating centrifugal separation unit 8 as indicated at 16. However, because this apparatus functions as a batch process, the discharge from the cutter head 2 will be interrupted when the rotating centrifugal separation unit 8 is processing.

Material delivery of chips or shreds 12 into the centrifugal separation unit 8 is done with the unit in motion. It is the purpose of the airfoil 18' on the top support 18 to guide the chips or shreds 12 into the rotating unit. The air movement created by the airfoil 18', in cooperation with the natural air flow through the ring sieve 10, moves the material into the screen processing area 22. As chips or shreds 12 enter the centrifugal separation unit 8 at 16, they will either be carried directly to the processing area 22 by centrifugal force, or will fall on the catch pan 24 where they will subsequently be flung to the processing area 22.

During the centrifugal process, it is necessary to tumble the chips or shreds 12 so that they re-orient, allowing the residual liquid waste to be stripped from all surfaces of the chips or shreds. The slowly rotating assembly consisting of the catch pan 24, the rake arms 42, and the rakes 40 will cause this tumbling action. The relative speed of the rotating catch pan 24 assembly to the centrifugal separation unit 8 is approximately five to ten revolutions per minute.

Centrifugal testing has been conducted to determine the ideal angular velocity for the apparatus. The tests were done with high density polyethylene (HDPE) oil container material contaminated with 30-weight viscosity motor oil. It was determined that acceptable stripping of the oil from the plastic commences at a centrifugal force proportional to an acceleration of 330 g. It was also determined that performance of the apparatus is improved as the angular velocity is increased. A range of tests were conducted to a centrifugal force upper limit proportional to an acceleration of 1,225 g. (Speed tests higher than this were deemed unadvisable for safety and mechanical considerations.) Required process dwell time is reduced proportionately as the higher radial forces are applied.

The ring centrifuge apparatus has been designed so that no dump doors or similar moving apparatus is required for discharge of the processed material at the end of the cycle. This has been achieved by the configuration of the rotating centrifugal separation unit 8; particularly by the slope of the centrifugal separation unit body 34 and bottom portion 36 walls.

At the end of the processing cycle, the rotating centrifugal separation unit 8 is slowed to a minimal revolution speed. At this slow angular velocity, the processed material will sluff away from the process area 22 and be carried out the discharge opening 30 by gravitational forces. To further augment this sluffing action, an air blast 38 (or series of air blasts with multiple units) is directed against the outside of the ring sieve 10 which forces the processed material to pass into the bottom portion 36 of the unit. If the unit is slowly revolving during the discharge portion of the cycle, the rakes 40 will also dislodge material from the process area 22.

The two cycle conditions of processing (that is, centrifugally removing the liquid contaminant from the process material), and dumping (that is, removing the material from the centrifugal separation unit 8) are controlled by the rotational speed of the centrifugal separation unit 8. This is best achieved by a variable frequency motor drive which allows frequent acceleration and deceleration of the load. This type of drive (as opposed to an SCR variable speed drive) also provides dynamic braking of the load so that the spinning load can be quickly decelerated.

In an embodiment of the apparatus of this invention which is more typically used in plant processing, a solvent spray may be used to wash the residual liquid waste contaminant from the chips or shreds 12 during the centrifugal process. In this embodiment, a solvent spray tube 98 is so mounted that the solvent may be directed against the inside of the load.

The advantage of a solvent spray during the process is realized in the removal of the soluble liquid contaminant at high concentration levels. This alleviates a low concentration contamination of subsequent wash cycle solvents (typically water) which must be treated in large volume to remove said contaminant. This is evident with such waste materials as soap (as will be found when reprocessing soap and detergent bottles) and the like, wherein a concentrated soap solution can be removed with the spraying action.

As a further refinement of said spraying process, the drain pipe 94 may be diverted for multiple stage rinsing. That is, a first light rinse may be used to remove a high concentration of waste material which would be processed in its concentrated form. Subsequent rinses may consist of heavy usage of the rinse solvent (most likely water) being diverted to the main waste water stream. As a further aid to increasing the concentration of the first rinse, the solvent may be recirculated from the drain pipe 94 back into the solvent spray tube 98 for a predetermined period of time.

A separation unit slinger 50 cooperating with the central vertical baffle 78 prevents a cross contamination from the processed material and the separated liquid contaminant in the interior of the containment vessel 52.

In reference to the preferred embodiment as shown in FIG. 5, it should be noted that provision for lubricating the bushings of the intermediate shaft 27 and the support hub 116 have been carefully considered. Further care has been taken to insure that the residual oil from lubrication—as well as the waste oil collected in the drip pan 24—is drained without contamination to the processed material. Thus, any oil which is centrifugally flung, will be carried out of the process with the contaminant oil. Oil which is gathered in the drip pan 24, or the shaft drain cup 134, will be carried from the process by means of the hollow central shaft 26.

In most cases, oil scavenged from both the central shaft waste collection 124 point and the drain pipe 94, is directed to the pumping and filtration 96 unit and collected as a salable by-product.

While the present invention has been described in conjunction with a single centrifugal embodiment (though comprising two diverse applications), it is to be understood that various modifications and other embodiments of the present invnetion may be made without departing from the scope of the invention as described herein and as claimed in the appended claims.

The embodiments of the invention in which an exclusive property or privilege is claimed are defined below:

1. In a centrifuge for separating recyclable granulated container material from a residual liquid waste contained in a liquid container prior to granulation, comprising:

a rotating sieve assembly including a central shaft driven by belting means in cooperation with a prime mover and a sieve screen circumferentially positioned relative to said central shaft, wherein said recyclable granulated container material is rotated at high angular velocity within said rotating sieve assembly with the purpose of removing said residual liquid waste from said recyclable granulated container material and wherein said residual liquid waste exits said rotating sieve assembly through said sieve screen;

said rotating sieve assembly being contained within a containment vessel wherein said residual liquid waste is collected, and;

said rotating sieve assembly having a central opening for loading said recyclable granulated container material at an upper extremity of said rotating sieve assembly and an opening for discharging said recyclable granulated container material at a lower extremity of said rotating sieve assembly wherein the improvement comprises:

(a) an annulus sieve screen with immediately adjacent impervious housing members steeply angled relative to said annulus sieve screen wherein the angle of said impervious housing members is such that recyclable granulated container material will readily fill an area defined by said annulus sieve screen with immediately adjacent impervious housing members when said rotating sieve assembly is subjecting said recyclable granulated container material to substantial centrifugal forces;

(b) a catch pan annullarly mounted to said central shaft obstructing said central opening of said rotating sieve assembly into which said recyclable granulated material entering said rotating sieve assembly will fall;

(c) at least one rack fixedly mounted to said catch pan for rotational motion about the axis of said central shaft whereby said recyclable granulated container material is continuously reoriented by the motion of said opposing rake along said annulus sieve screen, and wherein the operating clearance between said rake and said annulus sieve screen is only substantially sufficient for proper mechanical motion without obstruction between said rake and said annulus sieve screen;

(d) a driven means comprised of a belt power transmission system in cooperation with said prime mover whereby said catch pan is driven at a rotational speed slightly greater, or slightly lesser, that the rotational speed of said rotating sieve assembly; and, (e) a sharply inclined housing wall on a lower unit of said rotating sieve assembly wherein the angle of said sharply inclined housing wall relative to said central shaft is of such an angle that said recyclable granulated container material is caused to discharge by the force of gravity when said rotating sieve assembly is decelerated to a low angular velocity.

2. The centrifuge of claim 1 further including a hollow central shaft wherein said residual liquid waste is passed in a lower section of said hollow central shaft to a liquid waste collection apparatus wherein said residual liquid waste is first drained from an appropriate drainage passage within said catch pan into a shaft collection cup annullarly mounted to said central shaft, and further, where said shaft collection cup is provided with an aperture which drains said residual liquid waste into said hollow central shaft whereby said residual liquid waste flows to a collection basin and subsequently to said liquid waste collection apparatus.

* * * * *